United States Patent [19]

Dillow

[11] 4,118,003
[45] Oct. 3, 1978

[54] RADIO ANTENNA MOUNTING DEVICE

[76] Inventor: Paul E. Dillow, 11290 Glennon Dr., Denver, Colo. 80226

[21] Appl. No.: 853,969

[22] Filed: Nov. 21, 1977

Related U.S. Application Data

[63] Continuation of Ser. No. 753,239, Dec. 22, 1976, which is a continuation of Ser. No. 614,297, Sep. 17, 1975, which is a continuation of Ser. No. 507,157, Sep. 18, 1975, which is a continuation of Ser. No. 198,194, Nov. 12, 1971.

[51] Int. Cl.² .............................................. F16M 13/00
[52] U.S. Cl. ................................. 248/539; 248/226.1; 343/715
[58] Field of Search ........................... 248/226.1, 539; 343/713, 715, 720, 880, 882, 883

[56] References Cited

U.S. PATENT DOCUMENTS

| | | | |
|---|---|---|---|
| 1,571,407 | 2/1926 | Greist | 248/226.1 X |
| 1,671,510 | 5/1928 | Carmichael | 248/226.1 |
| 2,290,645 | 7/1942 | Lange | 248/539 |
| 3,056,570 | 10/1962 | Slavin | 248/539 |
| 3,071,338 | 1/1963 | Kaufman et al. | 248/539 |
| 3,100,241 | 8/1963 | Goldstein | 248/539 X |
| 3,710,339 | 1/1973 | Rima | 343/715 |

Primary Examiner—William H. Schultz
Attorney, Agent, or Firm—Arthur A. March

[57] ABSTRACT

There is provided herewith a mounting mechanism for radio antenna which is readily mounted and dismounted. The device includes a pair of telescoping members which coact to form a rigid main support. Each member has a curved clamp member adapted to be positioned around a curvilinear surface. The telescoping members and the clamp members are biased together by means of a pair of opposed biasing springs.

7 Claims, 2 Drawing Figures

INVENTOR
PAUL E. DILLOW

BY

ATTORNEY

RADIO ANTENNA MOUNTING DEVICE

This is a continuation of application Ser. No. 753,239 filed, Dec. 22, 1976 which is a continuation of application Ser. No. 614,297, filed Sept. 17, 1975 which is a continuation of application Ser. No. 507,157 filed Sept. 18, 1975 which is a continuation of application Ser. No. 198,194 filed Nov. 12, 1971.

BRIEF STATEMENT OF INVENTION

Briefly stated, the invention device is based on the concept of biasing together a pair of clamp members each of which is affixed to a telescoping member such that the distance between the clamps may be varied within rather wide limits. The clamps are biased together by a pair of spring members so that a rigid and firm support is provided for the antenna, and yet one which may be quickly and easily removed for transfer to another vehicle. By use of a pair of opposed biasing springs, operating on cross arm members affixed to the telescoping members, an equivalent bias is provided for the telescoping part, thus preventing binding which is common with this type device.

BACKGROUND OF INVENTION

This invention relates to a mechanism for mounting radio antennae on automobiles and trucks, and particularly to the mounting of radio antennae on the cabs of trucks.

Generally a truck cab is equipped with an extended rear view member, extended from the side of the cab by a frame extension made of small tubular pipe or the like. This is to enable the operator to safely get to the rear around a truck body which may be wider than the width of the cab.

It is also common practice for professional truck drivers to have their own radio receivers and antenna which they wish to transfer from cab to cab as they are assigned different vehicles. Transferring the antenna when mounted with the prior art mounting devices is often laborious and time consuming, since the mounting devices now available usually involve screw fasteners, bolts, and the like. In addition, such mounting devices for radio antennas and receivers are cumbersome, large and very difficult to transport.

The instant invention relates to a mounting device for radio antenna wherein the antenna may be quickly and easily removed an remounted on another vehicle. Particularly it relates to a mounting device which is designed to be supported by the mounting extensions of a rear-view mirror or the like having a pair of parallel, or substantially parallel tubular members.

The instant invention provides a mounting means for a radio antenna and receiver which, when removed from a cab is compact and simple to transport.

DETAILED DESCRIPTION OF INVENTION

Figure 1:
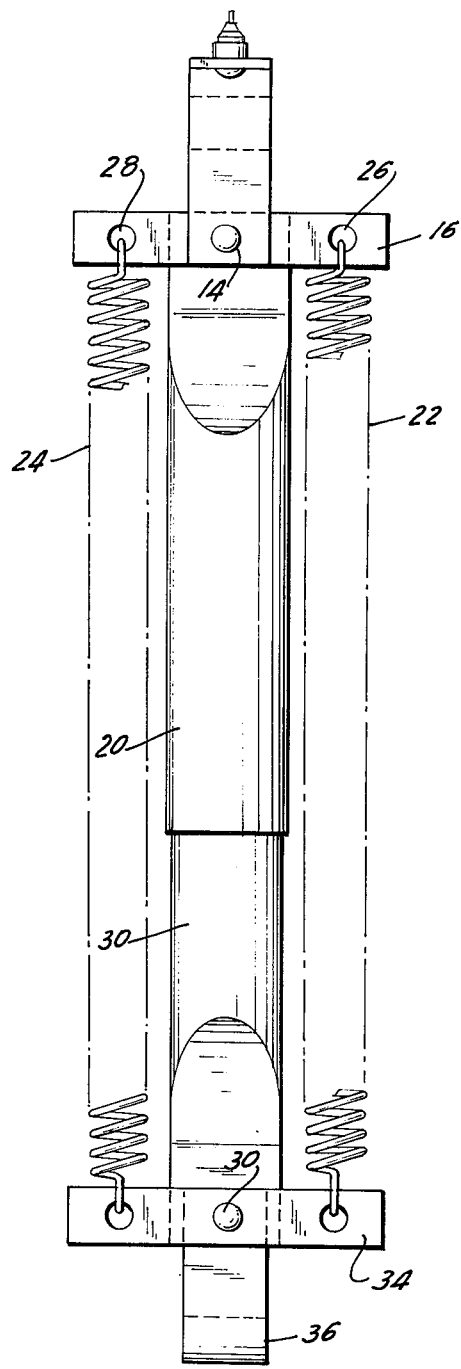
Figure 2:
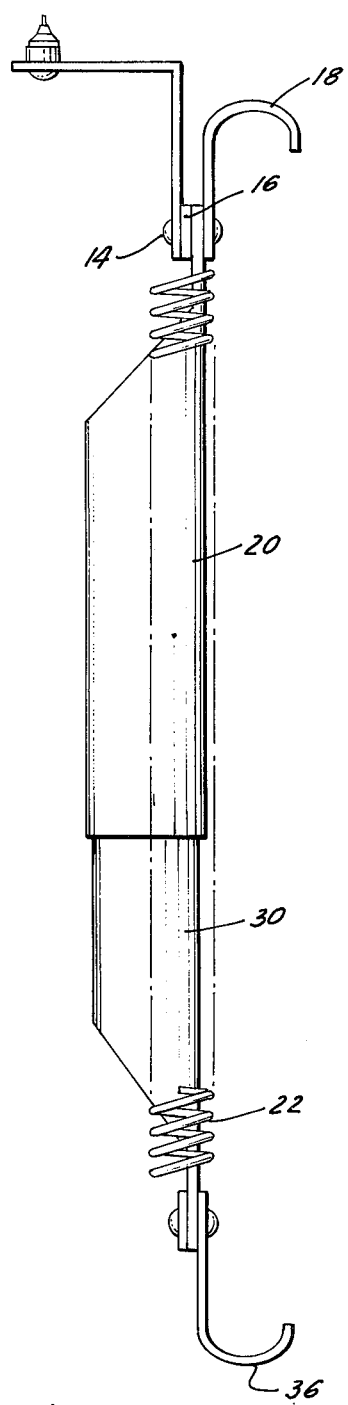

The invention will be more clearly explained by reference to the attached drawings in which FIG. 1, illustrates one embodiment of the invention in front view and FIG. 2, is a side view of the embodiment of FIG. 1.

In the drawings, reference numeral 10 indicates generally a radio antenna which is mounted in known fashion through an aperture in mounting bracket arm 12. The mounting of the antenna includes the ordinary insulation and cushioning features with lead and grounding wires positioned therethrough, these items being familiar to those skilled in this art and forcing no part of this invention.

Mounting bracket arm 12 is attached by fastening means, such as a bolt and nut or rivet and stud member 14, to upper tensioning arm 16, upper clamp member 18 and the upper portion of outer telescoping tube member 20.

Upper tensioning arm 16 extends at right angles to bracket arm 12 and the outer telescoping tube and laterally thereof. A pair of holes are provided to arm 16 equidistant from the ends of the arm and positioned laterally of the telescoping tube. A pair of biasing springs 22 and 24 are fastened to bracket arm 16, preferably by hooks 26 and 28 which are an integral part of the springs.

Operating within outer telescoping tube 20 is an inner tube 30 which slidably coacts therewith so as to form together a steady support member. The lower extremity of inner tube member 30 is secured, by means of bolt or stud member 32, to lower tensioning arm 34 and lower clamping member 36. The lower tensioning arm is a duplicate of upper arm 16, described above, and biasing springs 22 and 24 are attached to the arm in the fashion so described.

Clamp members 18 and 35 are indicated as being curved semi-circular in cross-section and are adapted to be snugly fitted to a curved surface such as a mounting rod frame for a rear view mirror such as normally is to be found on trucks, cabs and the like. However, the clamp may also be V-shaped etc. to fit any desired mounting configuration.

Thus biasing spring 22 and 24 tend to bias clamp members 18 and 36 together. To install the mount of this invention it is necessary only to spread the clamping members against the action of the biasing springs, place them about the mounting surface and the action of the springs holds the unit firmly and snugly in position.

Dismounting the device is equally rapid and convenient and is accomplished by simply spreading the clamps against the action of the biasing springs 22 and 24 and clamp members 18 and 36 may be removed from their position on a fender, mirror brace or the like.

To summarize briefly this invention relates to a novel mounting mechanism for radio antenna and the like, which is quickly and easily changed from one location to the other, and which is held solidly in position once located. The device comprises a pair of telescoping members which are held in closed relation by a pair of opposed biasing springs co-acting with a pair of cross arm members arranged on each of the telescoping members. Clamping means are provided on each of the telescoping members and thus are biased to their tightening or holding position by the biasing springs. When the mounting mechanism is removed from its position on the cab, the springs pull the telescoping tubes 20 and 30 together and a simple, compact and easily transportable unit is provided. Thus the present invention provides a mounting mechanism which is completely functional when in operating position and yet may be very readily carried in a collapsed state.

While the invention has been described in detail for illustrative purposes it will be understood that variations and modifications may be made without departing from the spirit of the invention as defined in the appended claims.

What is claimed is:

1. Radio antenna mounting device which comprises:

a pair of longitudinally opposed telescoping members extending along a common longitudinal axis and having corresponding outer extremities longitudinally remote from each other and corresponding inner extremities operating one within the other for varying the overall longitudinal dimension thereof and the corresponding overall linear distance between such outer extremities along the longitudinal axis to accommodate wide range interchangeable attachment thereof between longitudinally spaced apart clampable support surfaces of differing longitudinal spaced apart dimensions;

a corresponding pair of longitudinally opposed clamp members of selective fixed longitudinal dimension extending along the longitudinal axis and having corresponding inner ends longitudinally adjacent to and stationarily fixed to the outer extremities of the telescoping members and corresponding outer ends longitudinally remote from each other and defining clamping surfaces extending crosswise of the longitudinal axis in opposed facing relation to each other, said outer ends being longitudinally remote from the corresponding outer extremities of the telescoping members and said clamp members operatively extending longitudinally outwardly beyond such extremities a selective fixed cumulative linear distance corresponding to the combined selective fixed longitudinal dimensions of such opposed clamp members for common clamping coaction of the clamping surfaces to such clampable support surfaces and thereby concomitantly increasing the range of such interchangeable attachment beyond that of the overall longitudinal clamping dimension of the telescoping members and the corresponding overall linear distance between such outer extremities to the extent that such selective cumulative linear distance exceeds such corresponding overall linear distance between such outer extremities, and biasing means operatively interposed longitudinally inwardly of the clamping surfaces of the clamp members for biasing the clamp members longitudinally toward each other for such clamping coaction.

2. Device according to claim 1 wherein the biasing means are tension spring biasing means.

3. Device according to claim 2 wherein the biasing means include a pair of longitudinally extending and transversely offset exposed biasing tension springs correspondingly operating on opposed lateral sides of the pair of telescoping members.

4. Device according to claim 3 wherein a pair of longitudinally opposed and transversely extending tensioning support arms is provided longitudinally inwardly of the clamping surfaces of the clamp members for operatively interposing the tension springs on the opposed lateral sides of the pair of telescoping members.

5. Device according to claim 1 wherein a radio antenna mounting bracket is provided operatively extending longitudinally outwardly beyond a corresponding one of the clamp members.

6. Radio antenna mounting device which comprises:

a pair of longitudinally opposed telescoping members extending along a common longitudinal axis and having corresponding outer extremities longitudinally remote from each other and corresponding inner extremities operating one within the other in longitudinally slidable relation and forming a substantially transversely rigid and longitudinally expandable and retractable composite assembly for varying the overall longitudinal dimension thereof and the corresponding overall linear distance between such outer extremities along the longitudinal axis to accommodate wide range interchangeable attachment thereof between longitudinally spaced apart clampable support surfaces of differing longitudinal spaced apart dimensions;

a corresponding pair of longitudinally opposed clamp hook members of selective fixed longitudinal dimension extending along the longitudinal axis and having corresponding inner ends longitudinally adjacent to and stationarily fixed to the outer extremities of the telescoping members and corresponding outer ends longitudinally remote from each other and defining clamping hook surfaces extending crosswise of the longitudinal axis in opposed facing relation to each other, said outer ends being longitudinally remote from the corresponding outer extremities of the telescoping members and said clamp hook members operatively extending longitudinally outwardly beyond such extremities a selective fixed cumulative linear distance corresponding to the combined selective fixed longitudinal dimensions of such opposed clamp hook members for common clamping coaction of the clamping surfaces to such clampable support surfaces and thereby concomitantly increasing the range of such interchangeable attachment beyond that of the overall longitudinal clamping dimension of the telescoping members and the corresponding overall linear distance between such outer extremities and in turn of the composite assembly to the extent that such selective cumulative linear distance exceeds such corresponding overall linear distance between such outer extremities;

a pair of longitudinally opposed and transversely extending bilateral tensioning support arms situated longitudinally inwardly of the clamping surfaces of the clamp hook members and affixed to the outer extremities of the telescoping members;

a pair of longitudinally extending and transversely offset exposed biasing tension springs operatively interposed longitudinally inwardly of the clamping surfaces of the clamp hook members and correspondingly removably affixed to and extending between the tensioning support arms and operating on opposed lateral sides of the pair of telescoping members for biasing the clamp hook members longitudinally inwardly and toward each other for such clamping coaction; and a radio antenna mounting bracket operatively extending longitudinally outwardly beyond a corresponding one of the clamp members and affixed to the outer extremity of the telescoping member thereat.

7. Device according to claim 6 wherein the inner end of a corresponding one of the clamp hook members and a corresponding one of the tensioning support arms, and the mounting bracket are affixed to the outer extremity of one of the telescoping members by one common fastening means, and the inner end of the corresponding other of the clamp hook members and the corresponding other of the tensioning support arms are affixed to the outer extremity of the other of the telescoping members by another common fastening means.

* * * * *